Oct. 24, 1944.    J. KOLLMAN    2,361,351
COOKING UTENSIL
Filed May 15, 1941
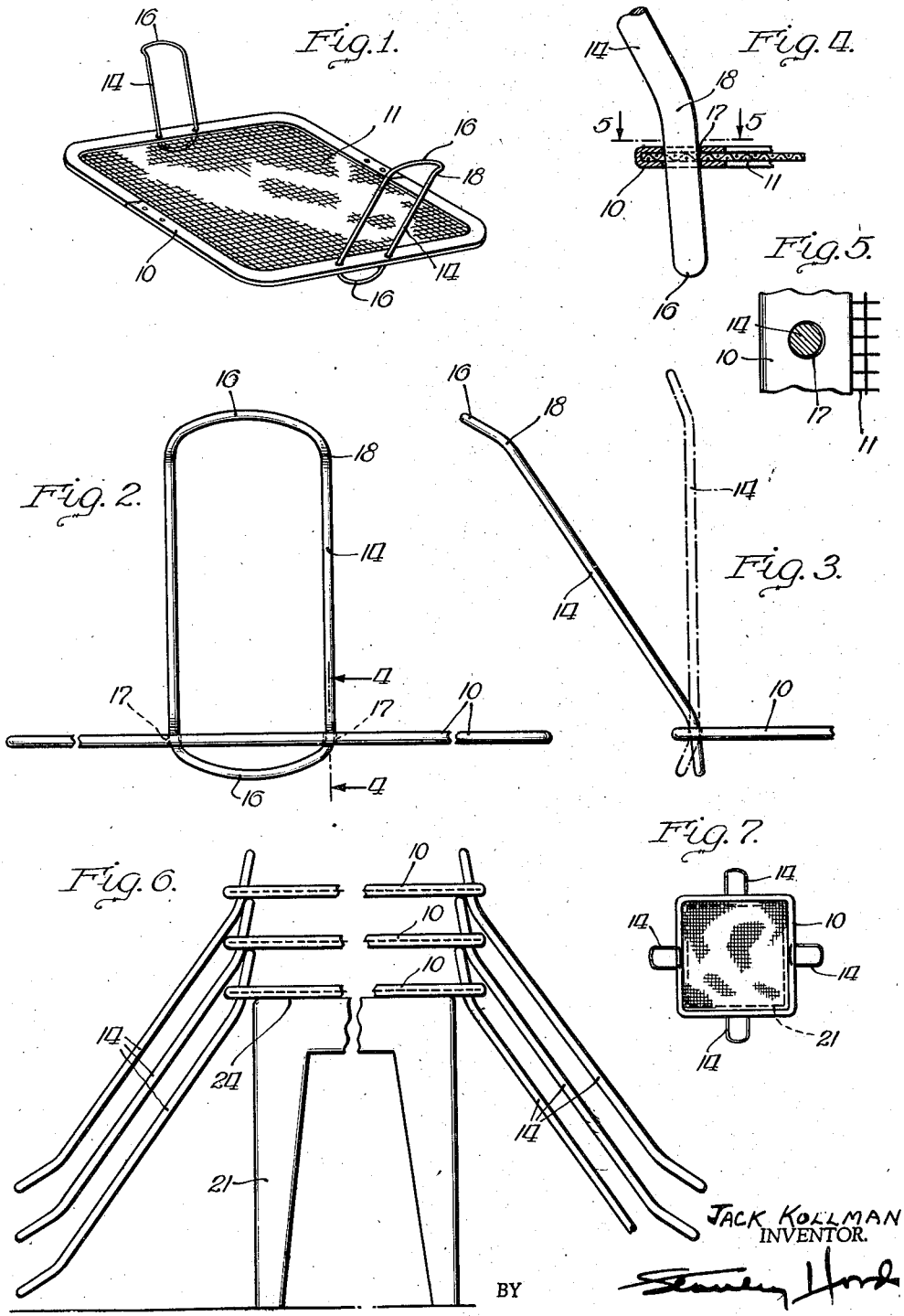
JACK KOLLMAN
INVENTOR.

Patented Oct. 24, 1944

2,361,351

UNITED STATES PATENT OFFICE 2,361,351

COOKING UTENSIL

Jack Kollman, Chicago, Ill., assignor to Ekco Products Company, a corporation of Illinois Application May 15, 1941, Serial No. 393,604

2 Claims. (Cl. 220—95)

This invention relates to improvements in a cooking utensil or tray which is available for receiving, draining and subjecting to action of air, articles of food, such as doughnuts, nut cakes, crullers, fritters, croquettes and the like which have been fried or cooked in heated or boiling fat, and refers particularly to handle mountings for utensils of this type.

It is an object of this invention to provide a handle mounting wherein the shank of the handles are slidable to position the handle in such a manner as to accommodate use of obverse or reverse sides of the utensil as well as to facilitate relatively compact nesting of a plurality of utensils of this character.

With the above and other objects in view, as will be apparent, this invention consists in the construction, combination and arrangement of parts, all as hereinafter more fully described, claimed and illustrated in the accompanying drawing, wherein:

Fig. 1 is a perspective view of a utensil embodying the features of this invention.

Fig. 2 is an enlarged fragmentary side elevational view of the utensil shown in Fig. 1 illustrating the handle in a position at the limit of its movement in a direction upward of the utensil, which corresponds to its normal operative position.

Fig. 3 is a fragmentary end elevational view of the utensil shown in Fig. 2, showing the handle in the limit of its outward canted position in full lines, and in non-canted position in dotted lines.

Fig. 4 is a fragmentary vertical section on line 4—4 of Fig. 2.

Fig. 5 is a fragmentary transverse section taken on line 5—5 of Fig. 4.

Fig. 6 is a fragmentary view in side elevation of a plurality of the present utensils in stacked position.

Fig. 7 is a top view of a plurality of such utensils in stacked position with the handles arranged in modified relation to that shown in Fig. 6.

Reference being had more particularly to the drawing, 10 represents a rectangular frame of suitable size composed of strap metal rebent longitudinally to form spaced upper and lower rims between which a wire screen bottom 11 or the like is suitably secured along its periphery. A pan or tray of this design and construction is well known in the baking art and is therefore chosen as an example of the various pan structures applicable to the subject matter of this invention. It is upon the surface of this bottom 11 that the articles to be cooked are supported. Since the upper and lower surfaces of the frame 10 and bottom 11 are of substantially identical contour, either face of the bottom 11 is adapted for use as an article supporting surface.

A preferred form of handle adapted for cooperation with the pan described above consists of an elongated loop of wire or the like providing straight parallel side arms 14 and outwardly arcuate end bars 16 joining opposite ends of the side arms 14. For the reception of the side arms 14 of a pair of such loop type handles, the frame 10 of the pan shown herein is provided at opposite sides of the pan with a pair of cylindrical openings 17 aligned transversely of the pan and spaced apart lengthwise of the side of the pan with which they are associated, a distance corresponding to the distance between the cooperating side arms 14 of the handle. These openings 17 provide bearings through which the arms 14 of the handle may slide freely lengthwise of said arms 14 and are preferably of a diameter exceeding the cross-sectional dimensions of the arms 14 whereby the arms may have a limited canting or tilting movement therein as shown in the drawing.

In lifting or carrying the tray by the end arms or bars 16 of each handle, the pan will seek to fall by gravity toward the bar 16 at the opposite end of the loop. By canting the handle arms 14 as shown in Fig. 3, the sides of the openings 17 will have a binding engagement with the adjacent surfaces of the arms 14 whereby the pan may be stabilized against any tendency to wobble relative to the handles. With the handles in the position shown in Figs. 2 and 3, for example, the arcuate undersurface of the lower end arms or bars 16 of the handles function, if desired, as cooperating bearings on which the pan may be supported in equilibrium on a suitable supporting surface or on which the pan may be rocked from side to side on the axis of said bearings. As will be observed further, the arms 14 are preferably of such length as to allow relatively deep immersion of the bottom 11 in a vat of cooking fat or the like and yet maintain the handle portion defined by the upper end bars 16 at a safe distance above the top level of the fat.

For the purpose of maintaining the handle in clearing relation to the sides of a vessel into which the pan 11 is moved to and from a position of immersion in the vessel contents, the handle arms 14 may be canted inwardly, as desired, in a range equivalent to the range of outward canting movement indicated between the two positions of the handle as shown in Fig. 3.

Each end arm or bar 16 of the handles contemplated by this invention is preferably bent as at 18 to slant outwardly from the axis of the associated arms 14. Thus, when a plurality of utensils of the construction contemplated herein are arranged in stacked relation as shown in Fig. 6, the end bar 16 of each handle, on being canted, is so positioned by the bend 18, as to cooperate with the underside of a superposed utensil to maintain said utensils in spaced stacked relation at a distance from each other substantially less than the length of the arms 14, and to position the portion of the arm 14 and the opposite end bar 16 of each handle therebelow at an angle adapted to clear the upper end bar 16 of the handle of a subjacent pan as well as the lateral limits of the subjacent pan when in such stacked relation.

As shown in Fig. 6, the lowermost utensil of a stack is preferably arranged on the top surface 24 of a table 21 so as to position the depending portion of the handles associated therewith in slightly elevated relation to the floor on which the table 21 rests.

As shown in Fig. 7, the handles of adjacent utensils may be arranged in criss-cross fashion without sacrificing compactness of stacking as shown in Fig. 6.

Since the loop type handle shown herein presents straight side arms 14 and uniformly designed end arms 16, the handles will be effective to similarly position the stacked utensils in relatively compact uniformly spaced relation regardless of which surface of the bottom is presented.

Though a preferred embodiment of the present invention has been described in detail, many modifications will occur to those skilled in the art. It is intended to cover all such modifications that fall within the scope of the appended claims.

What is claimed is:

1. The combination with a utensil including a pan body providing a supporting surface for articles to be carried thereby, means on said body providing a pair of openings at each of two transversely opposite sides of said body with the axis of each opening substantially perpendicular to the general plane of the pan body, each aforesaid pair of openings having a handle cooperating therewith comprising an elongated loop providing parallel side arms of equal length adapted to enter and slide lengthwise of the openings cooperating therewith, each arm being so proportioned relative to its cooperating opening as to have limited canting movement therein, the closed ends of each loop being adapted to coact with the openings in which associated side arms are slidable to limit sliding movement of said arms, the upwardly projecting end of each loop being cooperatively disposable with the corresponding end of the other loop to provide spacing members for engagement with the underside of a superposed utensil of similar construction to maintain said utensils in vertically stacked relation at a distance apart substantially less than the length of said side arms when the latter are at a limit of downward movement relative to the pan.

2. The combination with a utensil including a pan body providing a supporting surface for articles to be carried thereby, means on said body providing a pair of openings at each of two transversely opposite sides of said body with the axis of each opening substantially perpendicular to the general plane of the pan body, each aforesaid pair of openings having a handle cooperating therewith comprising an elongated loop providing parallel side arms of equal length adapted to enter and slide lengthwise of the openings cooperating therewith, each arm being so proportioned relative to its cooperating opening as to have limited canting movement therein, the closed ends of each loop being adapted to coact with the openings in which associated side arms are slidable to limit sliding movement of said arms, the upwardly projecting end of each loop being cooperatively disposable with the corresponding end of the other loop to provide spacing members for engagement with the underside of a superposed utensil of similar construction to maintain said utensils in vertically stacked relation at a distance apart substantially less than the length of said side arms when either pair of said cooperatively disposed ends is in upwardly projecting relation to the pan and in position to limit further downward movement of the side arms relative to the pan.

JACK KOLLMAN.